Jan. 4, 1966

W. A. PAILLE ETAL

3,226,967

APPARATUS FOR PRODUCING BLADES

Original Filed Oct. 9, 1958

Jan. 4, 1966   W. A. PAILLE ETAL   3,226,967
APPARATUS FOR PRODUCING BLADES
Original Filed Oct. 9, 1958   11 Sheets-Sheet 3

INVENTORS.
WILBROD A. PAILLE
FRANK M. FOWLER
BY GENE BELLI

ATTORNEY—

Jan. 4, 1966 W. A. PAILLE ETAL 3,226,967
APPARATUS FOR PRODUCING BLADES
Original Filed Oct. 9, 1958 11 Sheets-Sheet 11

INVENTORS.
WILBROD A. PAILLE
FRANK M. FOWLER
BY GENE BELLI

ATTORNEY—

United States Patent Office 3,226,967
Patented Jan. 4, 1966

3,226,967
APPARATUS FOR PRODUCING BLADES
Wilbrod Alfred Paille, Ludlow, Vt., Gene Belli, Arlington, and Frank Maxwell Fowler, Beverly, Mass., assignors to General Electric Company, a corporation of New York
Original application Oct. 9, 1958, Ser. No. 766,346, now Patent No. 3,147,539, dated Sept. 8, 1964. Divided and this application Oct. 18, 1963, Ser. No. 321,725
14 Claims. (Cl. 72—396)

This application is a division of our application Serial No. 766,346, filed October 9, 1958, now Patent No. 3,147,539 which in turn was a continuation-in-part of our application Serial 738,528, filed May 28, 1958, now abandoned.

This invention relates to methods and apparatus for the manufacture of blades of the type used in elastic fluid flow apparatus and the like.

With the advances made in the design criteria of elastic fluid flow apparatus, such as turbine engines, the required precision in the dimensioning of the blades has made necessary machining, grinding, polishing, and tumble-finishing operations which are costly and time-consuming. Moreover, manufacturing operations heretofore used do not assure the elimination of subsurface imperfections including folds, laps, and cold-shuts.

It has heretofore been proposed to roll-form the blades from work pieces including enlarged heads and by means of which the airfoil section is reduced to approximately its final dimensions.

It is an object of the present invent to provide a method and apparatus by means of which the aerodynamic surfaces of the blades of simple and complex shapes may be made in the absence of imperfections of any character resulting from any part of the blade-forming operations and by means of which the blades are completely and accurately finished with minimum requirements in respect to final finishing operations.

In carrying out our invention in one form thereof, a blade blank having a transition region joining a base portion and an airfoil section has a cross-sectional area which gradually increase from the cross-sectional area of the airfoil section to that of the base portion. Such a blade blank is first reshaped into a blade preform by applying to the back surface of the base portion a force of large magnitude which, through pivoted reaction members, develops reaction forces of progressively increasing magnitude angularly directed toward the transition regions to reshape those regions into the top surface the base portion and to form smoothly curved fillets from said transition regions. In forming the fillets, that part of the airfoil section adjacent them has its cross-sectional area reduced so that there may be received therewithin relatively movable arcuate surfaces of dies which further reshape the fillets and which are also mounted for roll-forming the airfoil section. During the reshaping of the fillets, a substantial force is applied to the back surface of the base portion to press the base toward the die surfaces adjacent the curved corner portions thereof.

During the roll-forming of the airfoil section, the force theretofore urging the base portion toward the roll-forming dies is reversed to maintain the blade in tension during the roll-forming of the airfoil section thereof.

Following the roll-forming, the blade preform is placed between a pair of coining dies having metal-shaping surfaces for engaging the airfoil section, and additional surfaces for engaging the top surface of the base portion. Concurrently with the coining operations, a force of substantial magnitude is again applied to the bottom face of the base portion to urge the top surface thereof against opposite surfaces of the coining dies.

The methods and apparatus characterizing the present invention provide great flexibility in the manufacturing operations, thus to make possible the accommodation of limitations in the starting materials to be used for the blades. For example, some metals, such as alloys of the nickel base type, must be annealed after each extruding, rolling, or upsetting operation before further reshaping may be satisfactorily accomplished. In other instances, whether the annealing be necessary or unnecessary, there will be enhancement of product quality by repeating selected method steps gradually to shape the metal into final form. In accordance with the present invention, there are provided provisions by means of which there is attained precise positioning of the parts for each successive pass, that is, for each repetition of selected steps to be carried out and as will be more fully described hereinafter.

We have found that in the practice of our methods and by the use of our apparatus, the aerodynamic surfaces including the airfoil section and the top surface of the base portion, except for a slight shaping or rounding of the narrow edge portions, may be brought to their final finished form without the need for further treatment of said surfaces. In addition to the production of blades of higher and uniform quality, the present invention has resulted in large and substantial savings in the manufacture of blades for use in elastic fluid flow apparatus.

In referring to the manufacture of blades, we use that term in the generic sense to include buckets, vanes, struts, and equivalent structures which are known in different arts under different names.

The subject matter which we regard as our invention is particularly pointed out and distinctly claimed in the concluding portion of this specification. Our invention, however, both as to organization and method of operation, together with further objects and advantages thereof, may best be understood by reference to our description taken in connection with the accompanying drawings in which:

FIG. 23 is an enlarged fragmentary sectional view of the roll-forming dies in the virtually closed position;

Figure 1:
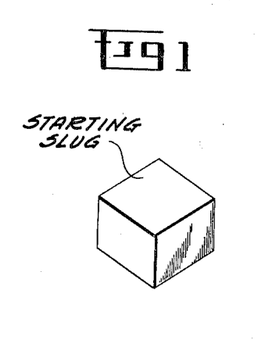
FIG. 1 is a perspective view of a starting slug.
Figures 2, 3:
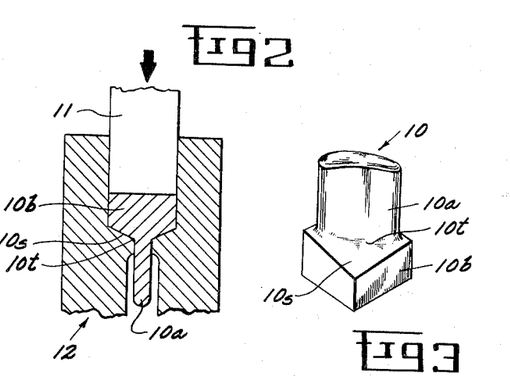
FIG. 2 is a partial sectional view of the extruded blade blank after extrusion in and prior to removal from an extruding die.
FIG. 3 is a perspective view of the extruded blade blank.
Figure 29:
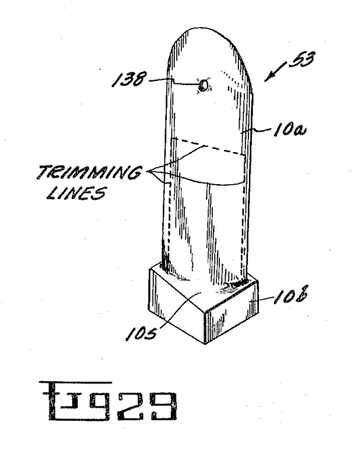
FIG. 29 is a perspective view of a coined-upset blade.
Figure 30:
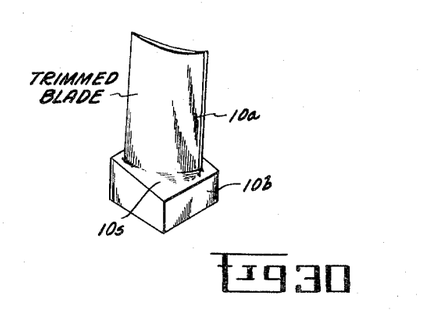
FIG. 30 is a perspective view of a trimmed blade.

The present invention is particularly concerned with the operations to be carried out upon a roughly shaped blade blank 10, such as illustrated in FIG. 3. Though the blade blank 10 may be produced in different ways, we prefer to produce the blank by extruding it from a starting slug illustrated in FIG. 1. A ram 11, FIG. 2, squeezes, or more particularly extrudes, the material through a shaping die 12, it being understood that the starting slug will have been heated to the requisite temperature to facilitate the extruding operation. After the extruding operation, the blade blank will be cleaned preparatory to the next sequence of operations. The blade blank 10, the blade preform 13, of FIG. 9, the rolled blade 53 of FIG. 18, and the coined and trimmed blades of FIGS. 29 and 30 are respectively characterized by the presence of a base 10b having a bottom surface 10c and a top surface 10s and also having an extension 10a forming the airfoil section. A transition region 10t, to be shaped into fillets 10f, FIG. 5, has a cross-sectional area which gradually increases from that of the adjoining portion of the airfoil section until it merges with the top surface 10s of the base 10b.

Figure 5:
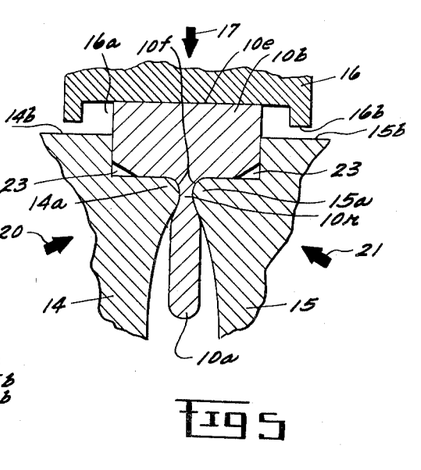
FIG. 5 is an enlarged fractional sectional view of the parts of FIG. 4 after the formation of the fillets and prior to upsetting of the base.
Figure 6:
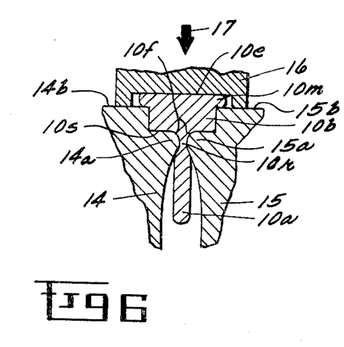
FIG. 6 is a fragmentary sectional view of the parts of FIG. 4 in their final positions which produce the blade preform.
Figures 8, 9, 10, 14:
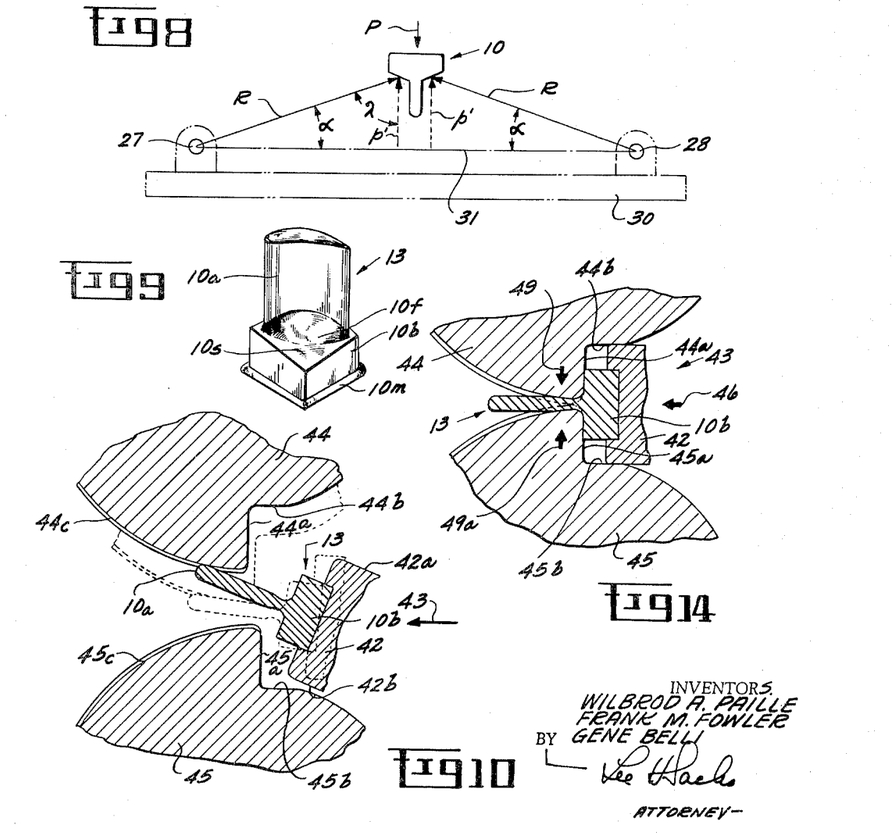
FIG. 8 is a force diagram explanatory of the operations performed by the apparatus of FIG. 7.
FIG. 9 is a perspective view of the prepinched blade blank which is also referred to as the blade preform.
FIGS. 10–13 are fragmentary sectional view of the method of introduction of the blade preform into the roll-forming apparatus.
FIG. 14 is a fragmentary sectional view of the parts of FIG. 10 and of the blade preform after further shaping operations.

In order to reduce to a minimum the possibility of surface imperfections due to the metal-shaping operations needed to convert the blade blank 10 into the substantially finished blade of FIG. 29, the blade blank will first be converted into the blade preform 13 illustrated in FIG. 9 and in more detail in the cross-sectional view of FIG. 6. To produce the blade preform 13, the blade blank 10 is, FIG. 4, disposed between opposed protuberances 14a and 15a of a pair of dies 14 and 15, the protuberances engaging the top surface 10s adjacent transition region 10t. The dies 14 and 15 carrying the protuberances 14a and 15a are in turn supported on reaction members, later to be described in more detail, and so arranged that upon application by a ram 16 of a force 17 of substantial magnitude to the bottom surface 10e of the blade blank 10, there will be developed, through movement of die members along arcuate paths 18 and 19, angularly directed forces 20 and 21, FIG. 5, applied to the top surface 10s at the transition regions 10t to reshape that surface and those regions to include smoothly curved fillets 10f which lie between top surface 10s and a region of substantially reduced cross-sectional area of the airfoil extension 10a.

Figure 4:
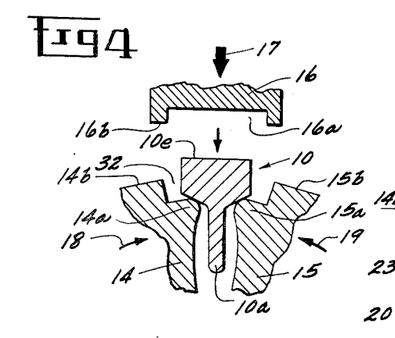
FIG. 4 is a fragmentary sectional view of the extruded blade blank in our prepinching apparatus prior to the prepinching operations which produce a blade preform.

In reshaping the transition regions 10t, the protuberances 14a and 15a act upon the top surface 10s and transition regions 10t in a manner which may be visualized, FIG. 4, as movement of the protuberances 14a and 15a angularly toward and into the transition region 10t. With this visualization of the action and with the base 10b for the moment assumed to be in fixed position, it will be seen that as the protuberances 14a and 15a reshape the top surface 10s, metal is displaced by the protuberances. Some of the displaced metal moves along the top surface 10s toward the airfoil section 10a. Some of it moves outwardly. At the same time, the airfoil section 10a is lengthened by the reduction in its cross-sectional area in the region 10r adjacent the fillets 10f. Thus, in the final positions of the protuberances 14a and 15a, FIG. 5, it will be seen that the smoothly curved fillets 10f interconnect the base portion 10b and that portion 10r of the airfoil section 10a of reduced cross-sectional area. By reason of the smooth, divided flow of a minimum of metal, there are avoided folds, laps, and surface-closed subsurface cavities known to those skilled in the art as cold-shuts. In FIG. 5, the dies 14 and 15 are in their final positions, but the metal-shaping operations have not been completed. It will be noted that there remain slight clearances or unfilled regions or spaces 23 located at the respective edges of the top surface of the blade blank. These spaces 23 are filled by upsetting the base 10b in the following manner. As the dies 14 and 15 are brought to standstill in the positions shown in FIG. 5, the forces 20 and 21 change from kinetic to potential forces, that is, they become holding forces. The force 17 is then effective, FIG. 6, to cause flow of metal into the spaces 23. This metal flow results from an upsetting action which, though not needed, may sometimes also produce a slight outward flow of metal at the back surface 10e into the area 16a, and as best illustrated by the flash 10m in FIGS. 6 and 9.

To set forth the important features of the invention thus far described has required step-by-step treatment. In practice, and as will now be explained, the foregoing operations are smoothly, continuously and rapidly carried out upon actuation of a press which moves the plunger or ram 16 from an initial position to a final position after which it returns to its initial position.

Figure 7:
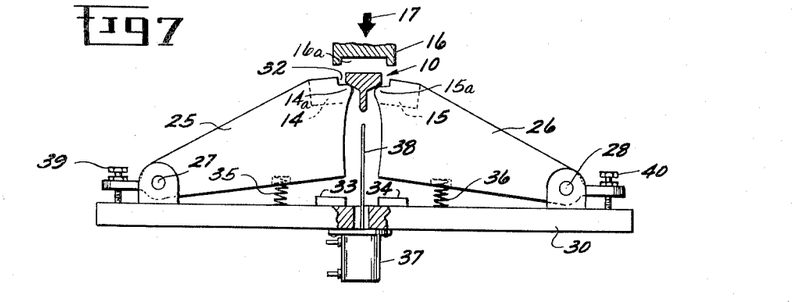
FIG. 7 is a diagrammatic illustration of one embodiment of our prepinching apparatus for forming blade preforms.

In a preferred form of the invention, FIG. 7, the dies 14 and 15 with their curved protuberances 14a and 15a are carried by two reaction levers or members 25 and 26 respectively pivoted at their remote ends by pivot pins 27 and 28 to a supporting structure or frame 30, preferably of steel. The levers or reaction members 25 and 26 produce in conjunction with the blade blank 10 a toggle action which upon application of a substantial force to the back surface 10e develops reaction force R, FIG. 8, applied toward the transition regions 10t of the blade blank 10. These forces R rapidly increase upon displacement of the reaction levers 25 and 26 from their initial positions toward their final positions.

In their initial positions the levers 25 and 26 lie at angles α measured from a line 31 interconnecting the axes of their pivotal mounting means 27 and 28. This angle α is preferably relatively small with the reaction levers 25 and 26 in their initial positions and decreases to about ten degrees or less with rotation of the levers about their pivot points in directions to reduce the separation distance between the protuberances 14a and 15a, thereby to produce the smoothly curved fillets 10f, FIG. 5, and to reduce the adjacent cross-sectional area 10r of the airfoil section. More particularly, if the entire actuating force P, FIG. 8, be applied to the back surface 10e by the mechanically or hydraulically actuated thrust member 16, there will arise oppositely acting reaction forces p'. Mathematically, $P = 2p'$. However, the reaction forces R will be of greater magnitude than the applied force P and many times the magnitude of each opposing force p'. Mathematically, $$R = \frac{1}{2} \cdot \frac{P}{\sin \alpha}$$

This expression means that as the angle α approaches zero, the sine of α approaches zero. Accordingly, the reaction forces R rapidly increase, with value infinity as their limit. Stated differently, the reaction forces R increase inversely as the cosine of the angle λ between the side p' of the force diagram of FIG. 8 and the hypotcause R thereof. The maximum magnitude of forces R tend to be limited by elongation of the base plate 30, of steel. The elongation of the heavy supporting plate is small but plays its part in controlling the magnitudes of the forces applied to blade blank 10.

With the foregoing understanding of the force diagram and the manner in which the reaction forces R are directed angularly toward the transition sections, it will be understood that the metal-shaping forces may comprise forces applied directly in the levers 25 and 26 concurrently with the application to the back surface 10c of a force to hold the blade blank into the position illustrated in FIG. 7 and to maintain it between the protuberances 14a and 15a until the final positions of the die members have been attained, as illustrated in FIGS. 5 and 6.

As shown in FIGS. 4–7, the force-applying means 16 is provided with a recess 16a within which the base portion of the blank 10 may nest, with clearance with the walls of the recess. The depth of the recess is selected to control, in conjunction with the recess 32 in FIGS. 4 and 7 jointly provided by the die structures, the thickness of the base of the blade preform when the force-applying means 16 is brought to its final position as shown in FIG. 6. The peripheral end surface 16b, FIG. 5, then engages the top surfaces 14b and 15b of the die members which form stops for ram 16. Thus, there is predetermined in accordance with the combined depth of the two recesses 16a and 32 the desired thickness needed to control the base of the blade preform of FIG. 9. The recess 32 provided by the dies 14 and 15 has walls which also predetermine the dimensions of nearly all of the side wall portions of the base 10b, since in the upsetting operation carried out in the apparatus the metal of the base portion is upset until there is intimate contact with the walls of that recess. However, the recess 16a provided in the force-applying member 16 is of greater cross-sectional area than recess 32 to provide clearance circumferentially about the bottom face 10e, thereby to provide the earlier mentioned metal-flowing space to accommodate flash 10m. Such a metal flow occurs during the upsetting operation in varying degree dependent upon the mass of metal initially comprising each base portion and resulting from the above-described extruding process. Though the mass of each base portion will be relatively uniform, there will be some variation which will result in flashes or metal flows 10m, FIG. 9, of differing degree. As shown in FIG. 6, there will in most cases be some free space about the final flash that may be formed. In the final position of the dies, as shown in FIG. 6, the base of the blade blank will have been reshaped so that its respective surfaces will intimately contact and conform with all surfaces of the walls forming the recess 32.

It will be further observed, FIG. 7, that as the reaction levers 25 and 26 are moved downwardly with decrease in the angle α, the lower portions thereof come to rest against fixed stops 33 and 34. As soon as these stops are engaged by the reaction levers, the reaction forces R become holding forces. The continued application of the force P as by the member 16 produces the final upsetting operation which has just been described. At this point the force P may be reduced to zero, hydraulically by operation of control valves, or mechanically by the passage of the stroke-applying means past the dead-center position. Thereupon, springs 35 and 36 are effective to rotate the levers 25 and 26 to return them to their initial positions. At the same time, there is effective a piston or spring means 37 to actuate upwardly an ejector 38, extending through an opening in the base plate 30, into engagement with the air-foil section 10a to move the blade blank outwardly of the levers. The upward movements of members 25 and 26 are limited by adjustable stops 39 and 40 carried by members 25 and 26.

The angular movement of dies 14 and 15 with the protuberances 14a and 15a in predetermined initial positions, as shown in FIGS. 4 and 7, assures accurate positioning of each blade blank. This feature is of importance when the characteristics of a particular alloy require a succession of the processing operations to bring the initial blade blank 10 to the desired dimensions for the blade preform 13 of FIG. 9.

Since the positioning of each part relative to the die members is certain and automatic, the metal-shaping operations always take place along the top surface 10s and including the transition regions 10t adjacent the airfoil section 10a.

With the blade preform 13 brought to its desired dimensions, which in general will include the diminution at 10r of the cross-sectional area of the airfoil section adjacent the fillets 10f to slightly larger than the final cross-sectional area of the finished airfoil section, the second stage in fabrication of the finished blade can begin after there has been removed from the preform any flash, such as shown at 10m.

In some cases it will be desirable to clean and anneal the blade preform 13 before initiating the roll-forming operations now to be described. The cleaning operations will be essential for those cases in which the preforming or prepinching operations are carried out on blade blanks the surfaces of which have been contaminated such as by oxidation.

As illustrated in FIG. 10, the blade preform 13 of FIG. 9 is securely held by holding means 42 which though biased upwardly, moves in the direction of arrow 43 to place the blade preform between the pair of die members 44 and 45 relatively movable one with respect to the other to decrease the separation distance between curved metal-shaping corners respectively interconnecting shoulder portions 44a and 45a and curved sections 44c and 45c. As shown, the die member 44 is moved downwardly. Its engagement with the airfoil section 10a tilts the airfoil section downwardly at the same time the holding means 42 is moving the preform 13 inwardly toward the shoulderders 44a and 45a. In the final position of the parts as illustrated in FIG. 14, the top surface 10s of the preform 13 is pressed against the shoulder portions 44a and 45a by a force indicated by the arrow 46 and the blade preform is no longer biased upwardly.

The holding means 42, as later illustrated, is mounted for rotary movement upon engagement of the upper surface of the airfoil section 10a, as shown in FIG. 10, by the die 44, the holding means 42 as a whole being biased to maintain the airfoil section 10a against the die 44, but without substantial opposition to said rotary movement. The positioning of the blade preform between the dies is certain and adapted to the positioning of blade preforms for a succession of operations of the type to be described in avoidance of any possibility of consequential galling and undesired disturbance of the airfoil surfaces, particularly the top surface 10s.

Figures 11, 12, 13:
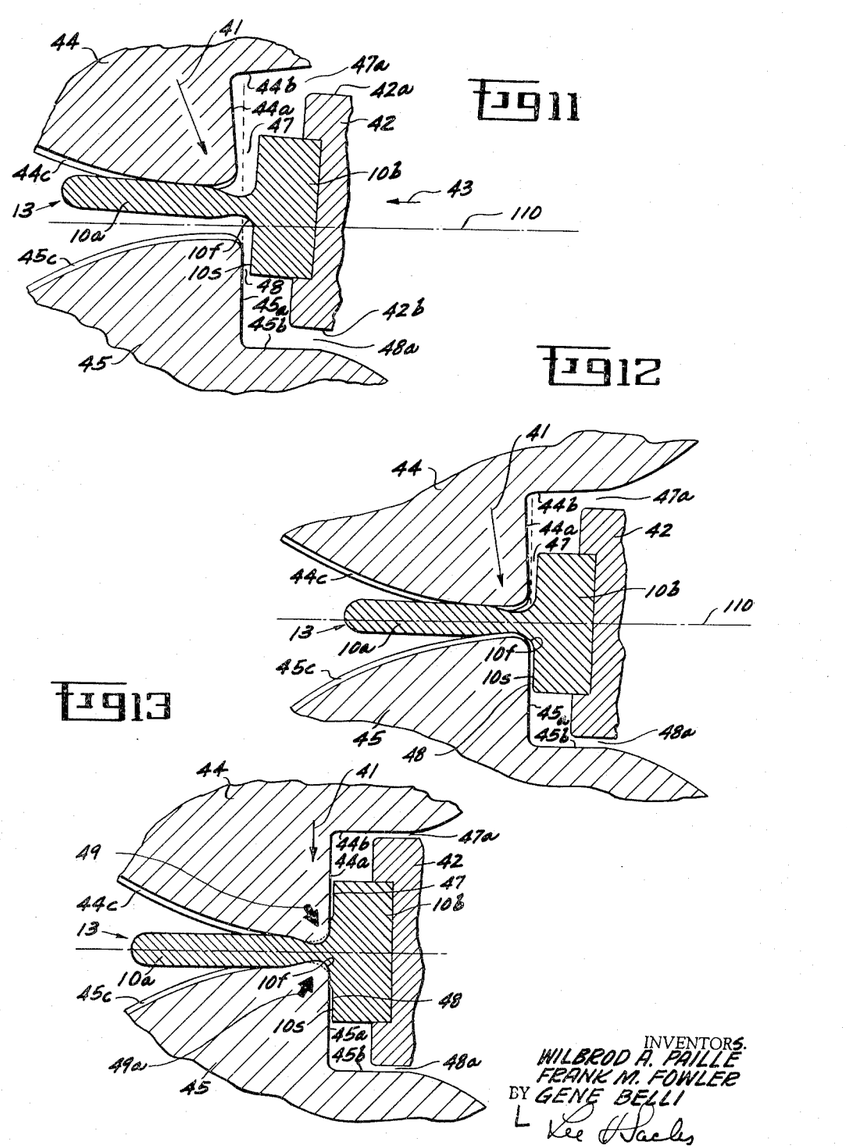

Referring now to FIGS. 11–13, the die 44 is moved toward the blade preform 13 and toward die 45 along an arcuate path, later to be described in more detail in connection with FIG. 21. Such a path is indicated generally by the successive positions of die 44 and arrows 41 which show the change in direction of movement.

As shown in FIG. 11, as die 44 pivots blade preform 13 toward die 45, the spaces or gaps 47, 47a, 48 and 48a are decreased, gap 47 being greater than gap 48 because of the upward bias of the blade preform. These spaces or gaps are shown somewhat exaggerated for clarity or illustration. The blade preform, therefore, is moved downward as well as toward the dies generally in the direction of arrow 43.

Die 44 continues to move blade preform 13 toward die 45 until contact of the preform with die 45 is made, FIG. 12. Blade preform 13 is still biased upwardly allowing the nose portion of die 44 between surface 44a and 44c to fit accurately and snugly into the fillet of the preform. As the above described nose of die 44 closes into the fillet, force is applied the resultant of which is shown by arrows 49 and 49a to shape and form the fillet area. The blade preform 13 now is no longer biased upwardly. As shown in FIG. 13, gaps 47, 48, 47a and 48a still exist but now are nearly symmetrical about center line 110.

Preferably, the forward movement of the holding means 42 is arrested as the parts approach the position shown in FIG. 12. As the die 44 arrives in about the position of FIG. 13, the arresting means is freed by the movement of die 44. The holding means 42 is then moved positively and synchronously with die 44 until the parts attain their final positions as shown in FIG. 14. The top surface 10s is then seated against the shoulders 44a and 45a. There is concurrently applied a substantial force 46, FIG. 14. There will be achieved any needed further reshaping of the top surface 10s and of the fillets to conform with the surfaces of the dies 44 and 45.

The holding means, as best shown in FIGS. 11–13, has opposite horizontal surfaces 42a and 42b which cooperate with guiding surfaces 44b and 45b to establish a fixed and reproducible vertical relationship between the base portion 10b and the airfoil section 10a. With this relationship established, FIG. 13, the force 49 moving the die member 44 into its final position will develop a reaction force 49a. These forces are both angularly directed toward the fillets. If the fillets be of shape other than in exact conformity with the curved nose portions of each die, they will be reshaped into exact conformity therewith.

As will be shown later, FIG. 20, this vertical relationship is complemented by a controlled horizontal relationship to assure exact and reproducible location of the blade preform 13 relative to the dies 44 and 45 if consecutive roll-forming operations are to be performed.

Figure 15:
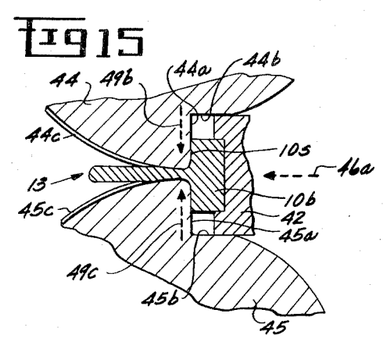
FIG. 15 is a fragmentary sectional view of the blade in our roll-forming apparatus in a momentary dwell position just prior to rolling.

With the final positioning of the blade preform between dies 44 and 45, and upon completion of the fillet and top surface sizing operation, the dies are maintained in fixed space relationship one to the other for a short "dwell" time, FIG. 15. At that time kinetic forces 46, 49 and 49a of FIG. 14 become potential forces 46a, 49b and 49c, FIG. 15, to hold the preform and allow the metal sized to complete its flow or movement. The dwell time may be accomplished by a series of controls, later to be described in connection with FIGS. 19, 22 and 24.

Figure 16:
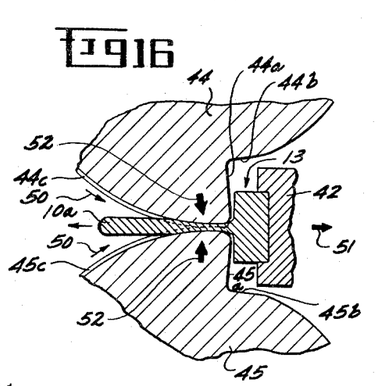
FIG. 16 is a fragmentary sectional view of the blade in our roll-forming apparatus just after the initiation of rolling.

The dies 44 and 45 are then relatively rotated, arrows 50, FIG. 16, to roll-form the airfoil section 10a. The roll-forming is accomplished with the blade preform 13 maintained under tension, as shown by arrow 51, a tension of magnitude adequate to prevent the preform from following the curved portions 44c and 45c of either of the dies and of a magnitude which is maintained substantially constant, notwithstanding changes in the surface speeds of the curved die surfaces 44c and 45c. The rolling forces are generally indicated by arrows 52. In FIG. 16 the blade preform has been shown in a position slightly displaced to the right by the curved surfaces 44c and 45c from the position illustrated in FIGS. 14 and 15. The rolling action continues, as shown in FIG. 17, to reduce the cross-sectional area of the airfoil section and to shape it into conformity with the die surfaces 44c and 45c. As the tip of the airfoil leaves the curved die surfaces, a bias on the holding means 42 tilts the rolled blade preform 53 upwardly and away from the die structure and to the broken-line position for easy removal upon release by the holding means 42. The rolled blade preform 53, FIG. 18, has smooth airfoil surfaces 10a and has a controlled thickness throughout the intended length thereof. Thus the blade preform 53 has a length and width materially greater than that required in its final form. The irregularities illustrated at the tip end can occur as the result of repeated rolling operations and by relief (increased spacing between the curved surfaces 44c and 45c) after the useful portion of the airfoil section has been accurately brought to the desired roll-formed dimensions.

Referring now to FIGS. 19–23, there has been illustrated a preferred apparatus for reshaping the top surface of the blade preform 13 and to roll-form the airfoil section in manner already described. Thus, FIG. 19, the die 45 is carried by a roll 55 carried by a shaft 56 pivoted between upturned portions 57a of frame 57. Thus the roll and the die 45 are held in fixed position relative to frame or foundation 57. The die 45 may be rotated upon movement toward the left of a link 63 pivotally connected through a pivot pin 62 to the ends of a pair of levers 61 which have their opposite ends secured to roll 55. The link 63 has its opposite end connected by pivot pin 64 to an equalizing link 65. Equalizing link 65 is secured to the piston or ram 67 of a hydraulic operator 68 by a pivot pin 66 located at a point midway on equalizing link 65 and slightly to the left of a line through the center of pivot pins 64 and 77.

Figure 19:
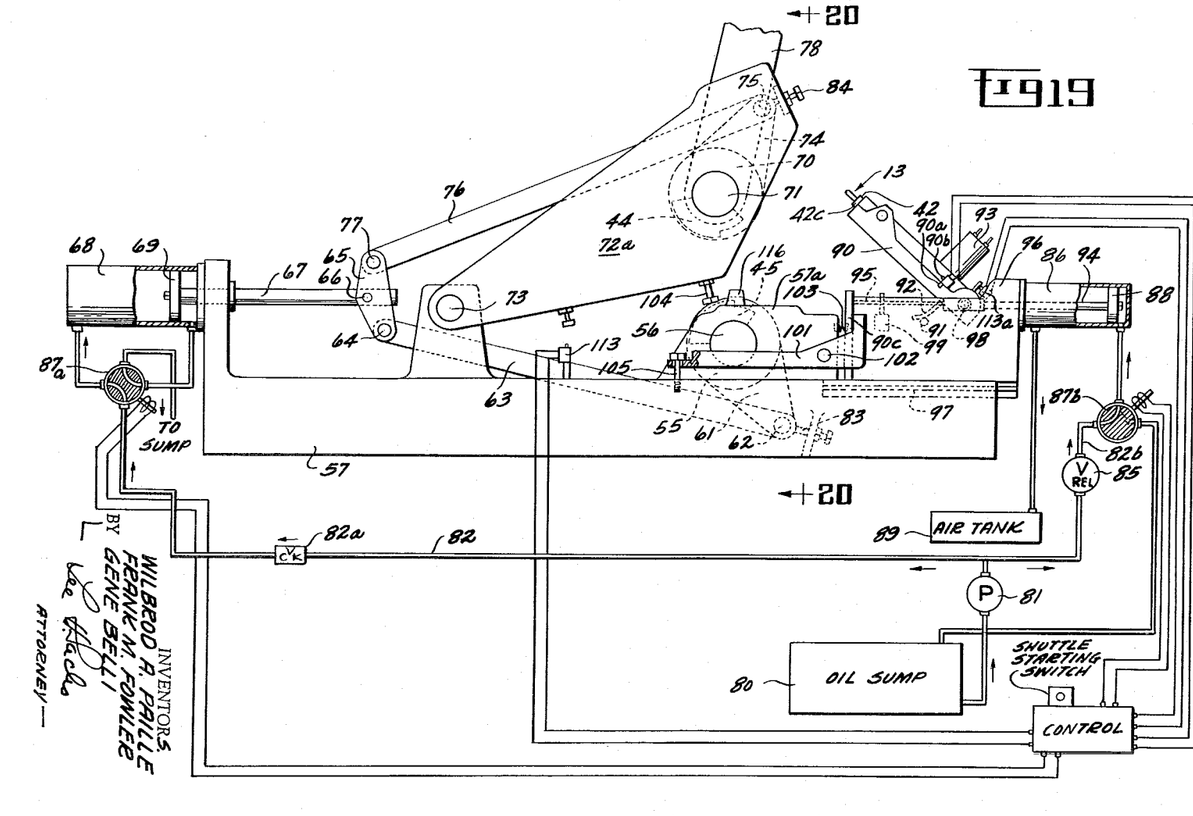
FIG. 19 is a diagrammatic side view of one embodiment of our metal-shaping and roll-forming apparatus in the fully opened position.

The bodily movable and rotatable die 44 is carried by a roll 70 supported by a shaft 71 guided by arms 72a and 72b of a supporting structure pivoted by shaft 73 to frame 57. Levers 74 secured at corresponding ends to roll 70 extend upwardly from roll 70 and by pin 75 are pivoted to one end of a link 76, the opposite end thereof being connected to equalizing link 65 by pivot pin 77.

Pivotally connected to pin or stub shaft 71 is a ram member 78, mechanically or hydraulically driven for bodily moving die 44 toward and away from die 45. It will be recalled that the dies 44 and 45, FIG. 10, have faces 44a and 45b which terminates in the curved edges or nose portions which merge with arcuate rolling surfaces 44c and 45c. Since the dies 44 and 45 rotate respectively about the axes of shafts 56 and 71, it is important during the movement, bodily, of the die 44 toward die 45 that the piston 69 of operator 68 for rotating the dies shall exert sufficient force to maintain continuous contact between link rods 63 and 76 and their respective stops 83 and 84. rods 63 and 76 and their respective stops 83 and 84. This may be accomplished by any suitable means, such for example, as a hydraulic actuating system which normally from a sump tank 80 and a constant volume pump 81 applies through a pressure line 82, a one way valve 82a and a solenoid valve 87a a hydraulic pressure to the left-hand side of piston 69. In this arrangement piston 69 maintains a forward velocity depending on the rise or fall of ram 78 and hence arms 72a and 72b. This maintains links 63 and 76 in the positions illustrated in FIG. 19. The lower end of link 63 abuts against an adjustable stop 83 carried by frame 57. The right-hand end of link 76 abuts against an adjustable stop 84 carried by a cross-member interconnecting arms 72a and 72b. Thus, the die 45 will not rotate as die 44 is moved toward it, and equalizing link 65 rotates to equalize links 63 and 76.

There is included in the pressure line 82 a pressure relief valve 85 having an adjusting means to predetermine the magnitude of the hydraulic pressure which may be applied to an operator 86 as well as to maintain a minimum pressure in line 82 and hence in operator 68. That is, the pressure relief valve 85 assures a differential pressure as between operators or actuators 68 and 86 so that the pressure on actuator 68 is always materially in excess of that applied to the actuator 86.

Assuming now that the solenoid valve 87a is in the position illustrated in FIG. 19, the fluid from pump 81 first forces piston 69 to the right to cause contact of links 63 and 76 with their respective stops 83 and 84 as shown. Then, when pressure in line 82 exceeds the adjusted minimum of relief valve 85, line 82 becomes pressurized. When solenoid valve 87b is actuated into the position shown in FIG. 19, fluid will act on piston 88 to move it to the left. In so moving, it displaces air into a pressure or air tank 89. This compressed air is utilized to place the preform 13 under tension during roll forming and also to return shuttle 90 to the position illustrated in FIG. 19.

It will be further assumed that a preform 13 has been inserted in the holding means. The blade preform may be readily placed in the holding means 42 since the shuttle

9

90 carrying it is held in an upwardly inclined position by a roller 91 engaging an extension 92 of the shuttle 90. It is convenient, though not essential to the invention, to elevate the holding means as illustrated in FIG. 19 for ease in placing the blade preform within the holding means which is then operated to hold securely the preform by an actuating means 93. The details of the holding and actuating mechanisms are conventional and, therefore, have not been illustrated in detail.

With the blade 13 held, and hydraulic fluid admitted to the actuator 86, the shuttle starting switch is activated and the piston rod 94 moves the shuttle 90 along guideways 95 of a carriage 96 to move the blade preform 13 toward the dies 44 and 45. Shuttle 90 will be moved to the left until a stop 90a and a switching means 90b on shuttle 90 contacts a stop 90c on carriage 96 to actuate ram 78. The carriage 96 is also slidable, supported in guideways 97 of the main frame 57.

As the shuttle 90 moves away from roller 91, it rotates by gravity or may be positively moved by a spring, not shown, about the pivot pin 98 which is roller-mounted in guideways 95 of carriage 96. As the shuttle descends, its lower surface engages an upwardly biased plunger 99. It is this plunger that positions the preform 13 in the angular position shown in FIG. 10 for entry between the dies 44 and 45.

As the blade preform 13 is moved beneath the upper die 44, switching means 90b initiates downward movement of that die member through the mechanically or hydraulically actuated ram means 78 which are pivotally connected to shaft 71. This downward movement, incident to the use of a mechanical press actuator, will be quite rapid. Accordingly, to assure accurate and precise registration of the preform 13 between the dies prior to engagement with any part of the preform, there is provided synchronizing means comprising actuating levers 101 pivoted at 102, which normally through the action of a spring 103 maintain carriage 96 in its right-hand position. The levers 101 can move the carriage 96 to the left or toward the dies by a predetermined amount. Thus when adjustable actuating surfaces 104 carried by the arms 72a and 72b engage the upper surfaces of the levers 101, there is a rapid movement of the carriage 96 to the left, against the bias of spring 103 to produce the force represented by arrow 46 of FIG. 14 and to seat the top surface 10s of the blade preform 13, FIG. 14, against the surfaces 44a and 45a at the same time that the curved nose portions of the die members 44 and 45 are moved inwardly into and against the fillets of the blade preform 13 as has been previously described. Inasmuch as the movement of carriage 96 is produced entirely by the engagement of levers 101 by the surfaces 104, there is synchronized and precise movement of the preform 13 into and between the dies 44 and 45 as shown. In this connection, it is to be noted that the top surface 10s throughout a major portion of its area engages surfaces 44a and 45a for precise positioning. That top surface 10s is maintained against surfaces 44a and 45a with a force equal to that developed by the actuator 86. Actuator 86 will counteract any over-travel of the carriage 96 beyond the point where the top surface 10s and the surfaces 44a and 45a are in engagement, as shown in FIGS. 14 and 15. Such over-travel of the carriage 96 cannot be transmitted to the shuttle 90, since there is a corresponding right-hand movement of the piston rod 94 of the actuator 86 relative to carriage 96, thus to permit the shuttle 90 carried thereby to remain stationary relative to surfaces 44a and 45a. The levers 101 are provided with adjustable stops 105 mounted in frame 57 to adjust the travel of carriage 96 produced by biasing means 103.

Since the upper die 44, FIGS. 10–13, has surface 44a disposed in sharp angular position relative to the curved surface 44c, it is important that there be minimized any possibility of engagement of the curved edge or nose portion of the die 44 with the upper corner of the blade preform 13 as the dies are moved inwardly. Accordingly, the die 44 is arranged to swing about an arc 107, FIG. 21, which generally can be described as being tilted away from the final position of surface 10s. More precisely, and as best shown in FIG. 21, a tangent 108 from the arc of movement of die 44, taken from the point 109 of intersection thereof with the center line 110 formed by a trace of the central airfoil-rolling plane between the die members 44 and 45, lies at an angle Δ to a line perpendicular to the line 110. This angle Δ is produced by locating the axis of shaft or pivot pin 73 for the supporting arms 72a and 72b at a point nearer the die 45 than the die 44 and particularly in a direction displaced toward die 45 from the line 110 as indicated by the somewhat exaggerated displacement dimension X in FIG. 21.

Figures 17, 18, 21:
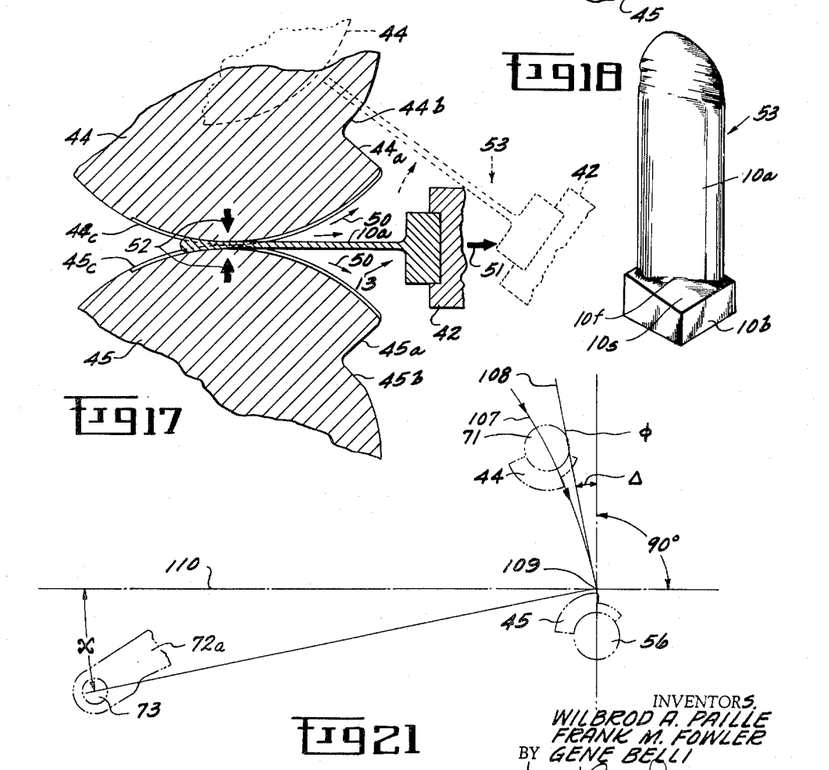
FIG. 17 is a fragmentary sectional view of the completion of our roll-forming operations.
FIG. 18 is a perspective view of the blade after roll-forming.
FIG. 21 schematically illustrates, with some exaggeration, the manner in which the movable die of FIGS. 10–13 moves into and out of registry with a blade preform.

FIG. 21 alone does not delineate in full the positioning of die 44 as it traverses its arcuate travel path 107. Thus in FIG. 21, the arc is shown as passing through the curved nose portion of die 44.

Figure 20:
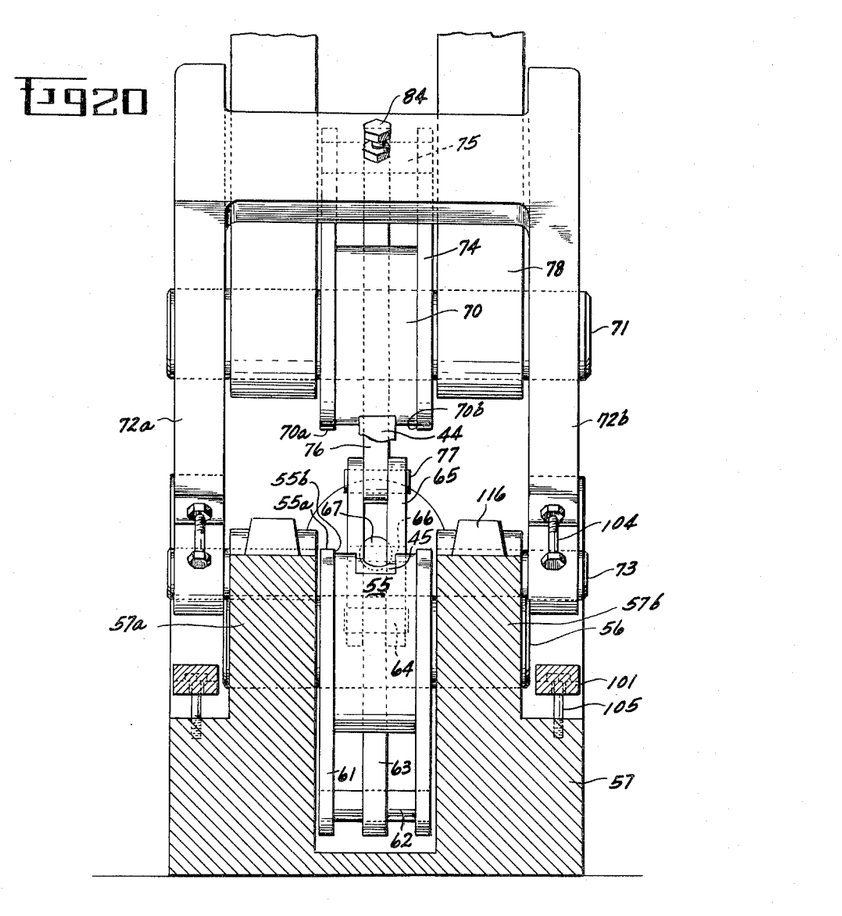
FIG. 20 is a sectional view taken along the line 20—20 of FIG. 19.

As best shown in FIGS. 19 and 20, it will be noted that the dies 44 and 45 are carried by the rolls 70 and 55 midway thereof and with the arcuate surfaces, FIG. 23, located so as to leave a very slight spacing as indicated at 114, 115 on either side of the die cavity 112. With the dies in the positions of FIGS. 22 and 24, the rim portions 55a and 70a of the rolls 55 and 70 engage each other and thus absorb the downward force applied by the actuating means 78. The rolling pressure on the airfoil section of the die is thus applied indirectly rather than directly from the actuating means 78. Thus, the rim portions of the rolls 55 and 70 may be loaded to a greater extent than is actually required by the dies 44 and 45. The effect of the increased loading is to insure that the dies will perform their rolling functions, since the rolling forces will be maintained notwithstanding any slight deflection that may occur in the apparatus. This is a factor contributing to the high quality of the product. As shown in FIG. 20, shock absorbers 116 in the form of rubber cushions may be included on the frame 57 to absorb kinetic energy from ram 78 and connecting parts. Thus damage to the rims 55a and 70a is avoided.

As was mentioned before in connection with FIGS. 11–15, surfaces 42a and 42b on the holding means 42 cooperate with grinding surfaces 44b and 45b respectively to establish a fixed and reproducible vertical relationship between the base portion 10b and the airfoil 10a. A similar fixed and reproducible horizontal relationship is established through the cooperation of surfaces 70b and 55b, FIG. 20, with vertical side surfaces 42c of holding means 42, FIG. 19. Thus guiding surfaces on the rims and rolls cooperate with guiding surfaces on the holding means to establish a fixed and reproducible positioning of the blade preform 13 in both the horizontal and vertical directions. This precise positioning arrangement allows accurate consecutive operation of rolling cycles thereby avoiding scuffing on recycling of the surfaces already formed.

Figure 22:
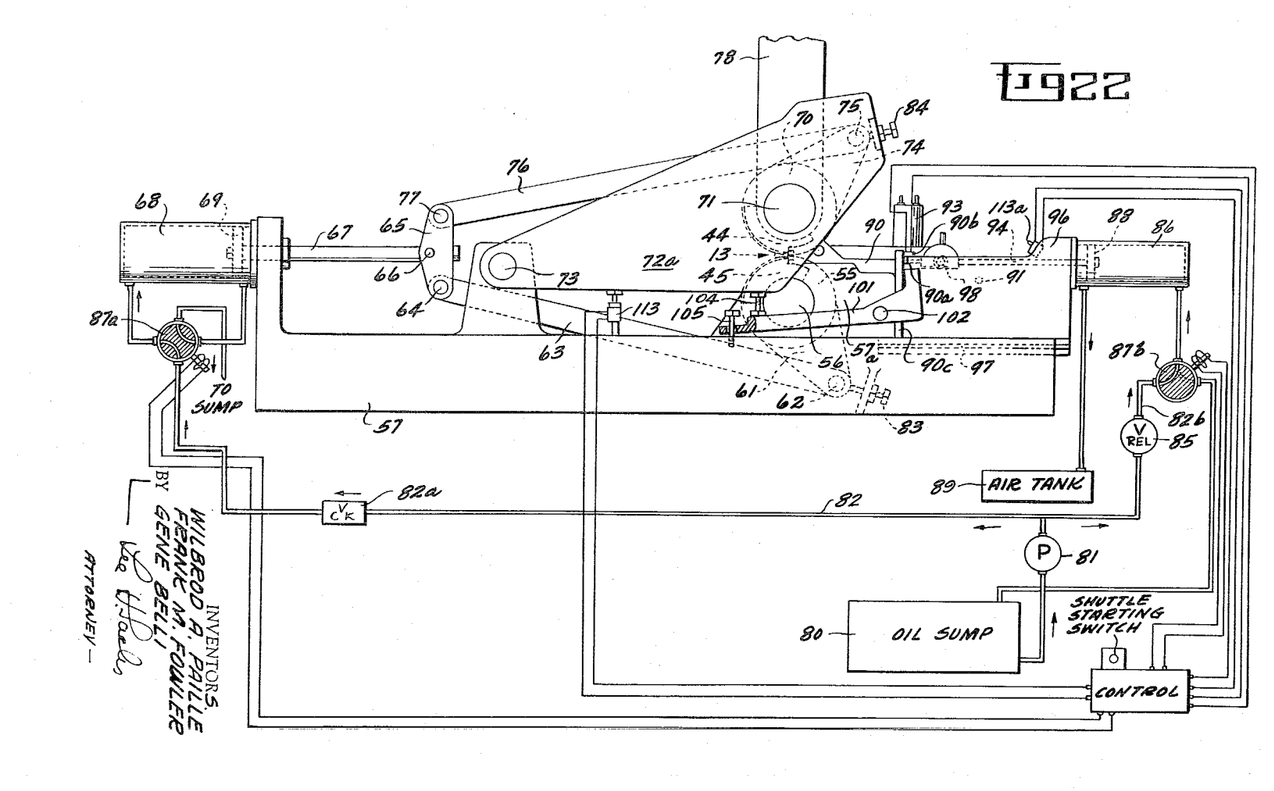
FIGS. 22 and 24 are like FIG. 19 but with the parts in different positions.

With the dies closed, FIG. 22, and after the reshaping of the fillets by the movement of the force-producing means 78 from its initial to its final position to bring the dies to their final positions, as shown in FIGS. 14 and 15, a solenoid operated valve 87a is actuated by timed switching means 113 being contacted by arm 72a to transfer the hydraulic pressure to the right-hand side of piston 69 for actuation of the piston rod 67 to the left. Through the equalizer link 65, the links 63 and 76 rotate the dies 44 and 45 in directions indicated by arrows 50, FIGS. 16 and 17, to roll-form the airfoil and in a manner above described in considerable detail.

Figures 24, 25:
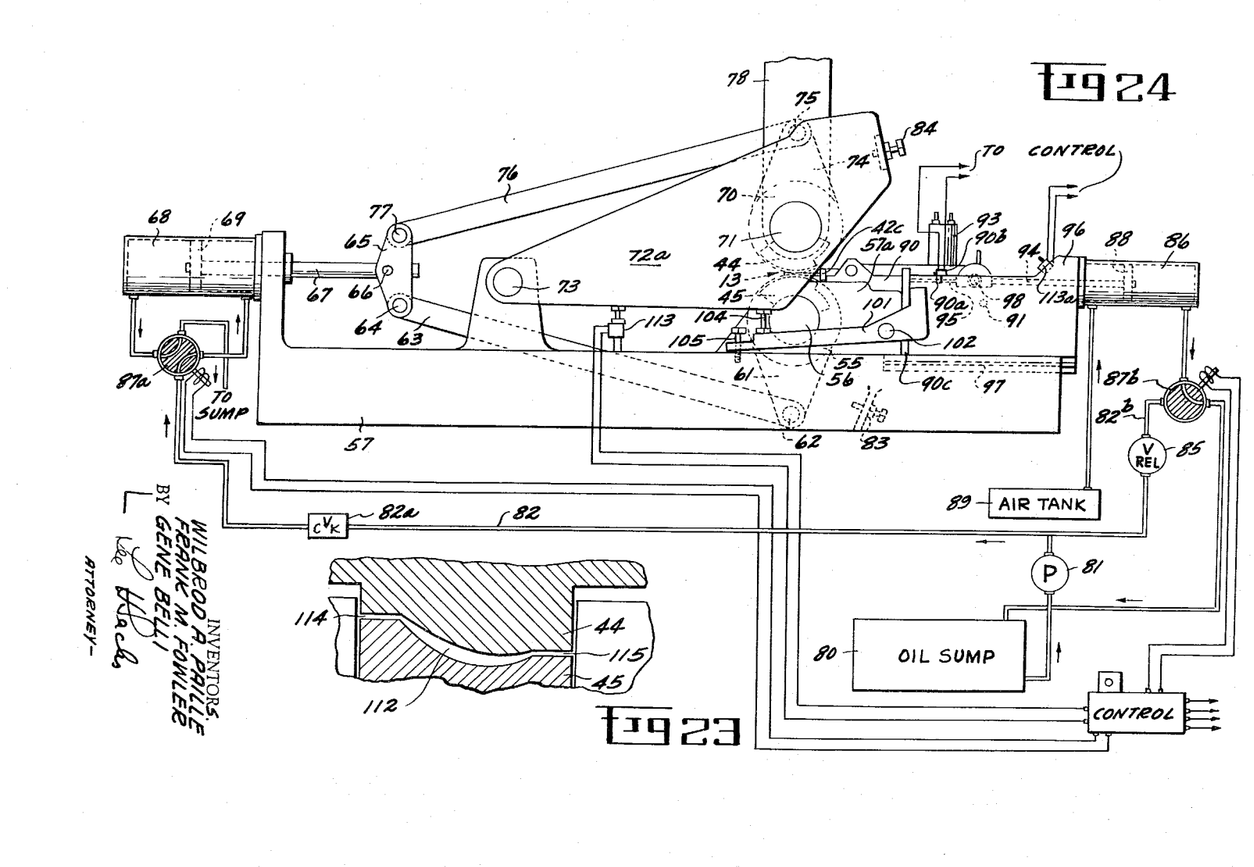
FIGS. 25–28 are fragmentary sectional views of the coining apparatus for the rolled blade preform illustrating different positions during coining.
Figure 25:
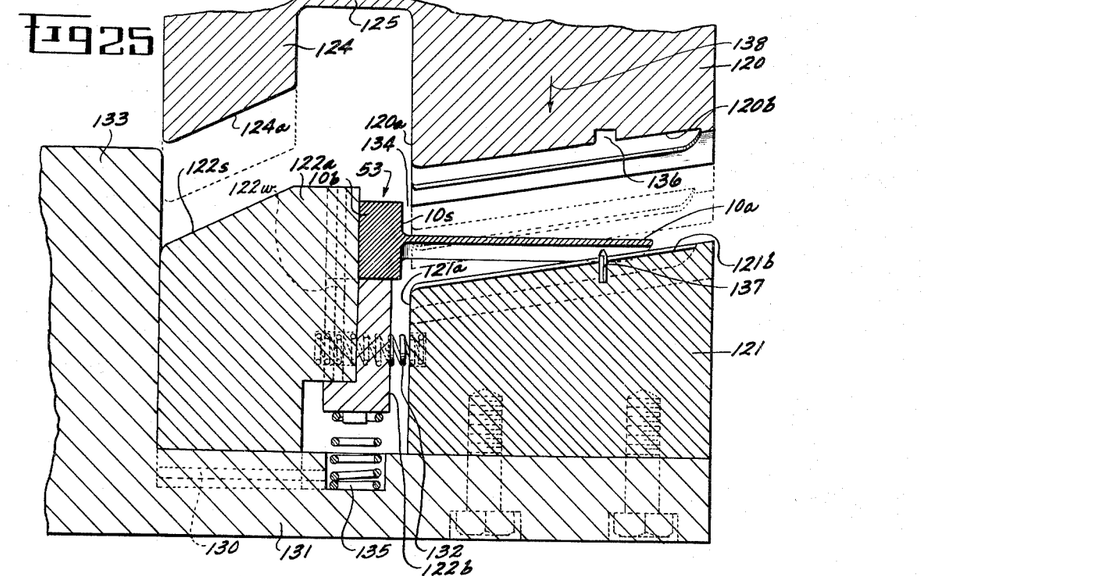

As the valve 87a is actuated to apply the roll-forming forces to the dies, the valve 87b is rotated to connect the oil-filled portion of the actuator 86 to the sump. Accordingly, as soon as valve 87b connects the oil-filled portion of the cylinder to the sump, the compressed air of tank 89 is effective on the piston 88 of actuator 86 to apply a force to move it to the right. This force indicated at 51, FIGS. 16 and 17, places the blade preform 13 under tension during the rolling operations. The parts in positions during the roll-forming are shown in FIG. 24. Upon termination of the rolling operations, the compressed air is effective in returning the shuttle 90 to the illustrated position in FIG. 19 at which point it contacts switching means 113a to raise ram 78. The spring 103, FIG 19, returns carriage 96 to its right-hand position, the heads of cap screws 105 threaded into the frame 57 serving as stops for levers 101 and for the carriage 96.

It is important to note that the intermediate pivotal connection 66 between the equalizer link 65 and piston rod 67 is displaced to the left from a line interconnecting the axes of pivotal connections 64 and 77 of links 63 and 76. By rotation of link 65, FIG. 24, about pivot pin 66 the result of this equalizer—of the negative type—is to maintain an optimum balance between the surface speeds of the dies 44 and 45 with a tendency to keep the movement of the dies in proper synchronization. Such action minimizes any slippage or scuffing between the curved die surfaces and the arifoil. Surfaces of improved character are thereby attained on the opposite faces of the roll-formed airfoil 10a of FIG. 18. The absence of slippage as between the dies and airfoil surfaces also represents a highly favorable factor in extending the life of the dies. The equalizer link 65 is important to each roll-forming operation by reason of the fact that one surface of the airfoil section is convex and the other concave, as best shown by die cavity 112, FIG. 23, thus requiring different rolling curvatures of the dies and, in general, different resistance to roll-forming. It will be noted that the line of action of the piston rod 67 is displaced upwardly from the axis of rotation of the arms 72a and 72b about shaft 73. Accordingly, after completion of the rolling action, a reversal of movement of the piston rod 67 will, through the linkage means, produce a reverse rotation of the two dies to return them to their starting positions, notwithstanding any degree of displacement that may have occurred during the roll-forming operations. This assures accuracy in the return of dies 44 and 45 into the fillet 10f if subsequent roll forming operations are required.

Upon completion of the roll-forming of the airfoil section, the valves 87a and 87b are returned to the positions shown in FIG. 19.

As the actuator 68 moves rod 67 to the right, the link 65 will be pivoting about its axis 66, while the links 63 and 76 will be rotating the dies 44 and 45. Concurrently, the die 44 will be moving upwardly by reason of the upward movement of the force-applying member 78. Though the spring-biased plunger 99 will already have lifted shuttle 90 to about the position shown by dotted lines in FIG. 17, as the extension 92 engages roller stop 91, the shuttle will be further tilted to the positiin of FIG. 19 for easy removal of the finished roll-formed blade upon release of the holding means by the actuator 93.

After the required number of roll-forming operations on each blade preform, the roll-formed blade will be ready for the coining operations which will now be described.

The first step, FIG. 25, in the final coining operation is to place rolled blade preform 53 between a pair of dies 120 and 121 which, as shown in FIG. 25, are initially in spaced relation one to the other. The positioning of the preform 53 between the coining dies is accomplished by holding the base portion 10b in a recess of what may be termed anvil members 122a and 122b adapted to be actuated to press the top surface 10s of the preform 53 against the shoulders 120a and 121a of coining dies 120 and 121 after they have been substantially closed, FIG. 27, and their curved corner portions have seated, or substantially seated, against the curved fillets 10f. The anvil or supporting members 122a and 122b are moved to positions where the top surface 10s of blade 53 will engage the surfaces 120a and 121a, a force 123, FIG. 27, being developed of magnitude adequate to assure a sizing, smoothing ironing, or final finishing operation on that top surface. In order that the foregoing operations may be closely controlled, the anvil members 122a and 122b are moved in synchronism with the closing of the coining dies 120 and 121. This synchronous movement, which takes place as the coining dies close upon the airfoil section, is accomplished, as best shown in FIG. 25, by moving together both the coining die 120 and an actuating member 124 as by actuating means 125 hydraulically or mechanically operated as by a toggle press so that as the coining die 120 moves toward the coining die 121, the actuating member 124 through its inclined surface 124a engages a mating inclined surface 122s of the anvil 122a to move the latter along ways 130 of frame 131 toward the right at a speed preferably greater than the closing movement of the coining dies. The greater speed of the anvil or supporting member 122a will be accomplished if the angle as measured from the horizontal line of movement of member 122a to the inclined surfaces is less than 45°.

The top surface 10s and the fillets are reshaped as the coining dies engage the airfoil section 10a but in avoidance of any displacement of metal in any portion of the aerodynamic surfaces of a character which will give rise to any laps, folds, or cold-shuts. The coining operation, which is both a sizing and a final shaping operation of the aerodynamic surfaces, brings into the final desired configuration the airfoil surfaces. As best shown in FIG. 25, the coining surfaces 120b and 121b respectively extend upwardly at an angle to the faces 120a and 121a to establish a relationship suitable for certain types of blades. The coining surfaces may extend at any suitable angle which will be determined by the slope of the top surface 10s which is held perpendicular to the movement of die 120.

For the rolled preform 53, the coining surfaces 120b and 121b are inclined upwardly at an angle such that a line extending through what are termed by those skilled in the art as "stacking points" in the final coined blade will be at a predetermined angle with reference to surface 10s. In this manner, the coining dies after engagement of the airfoil surfaces impart thereto the warp and other final configurations desired in that section. It will be desirable to actuate the coining dies by a toggle press in order to provide a dwell of the dies in their final positions, that is, a short interval in which the dies are at standstill. The dwell provides time for the metal to flow into its final configuration.

With the parts in position preparatory to the coining operation, FIG. 25, the anvil member 122a is biased, as by spring assemblies 132, to the left and against a stop member 133. As the die 120 and actuating member 124 are moved downwardly, arrow 138, the shoulder or forming face 120a of die 120 has adequate clearance as indicated at 134, FIG. 25, with the top surface 10s of the preform 53 to minimize any possibility of contacting the preform during closure of the coining dies. It will also be observed that the anvil 122b slidably carried in dove-tail ways 122w of anvil 122a is biased upwardly by spring assemblies 135, a shoulder portion engaging a mating shoulder of the anvil member 122a to limit upward movement thereof.

Figure 26:
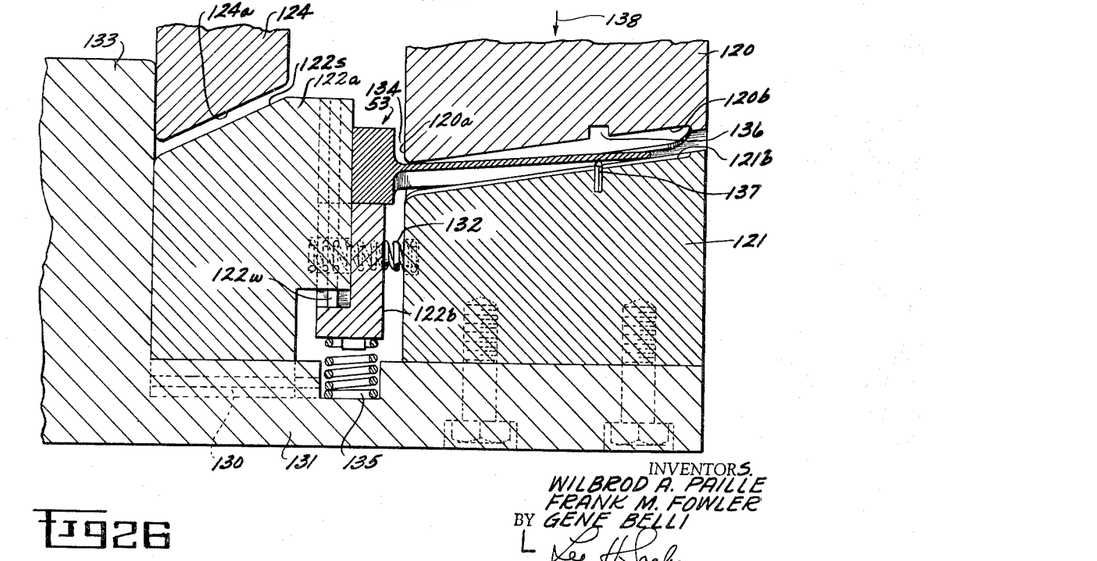

As shown in FIG. 26, the outer tip of the airfoil portion 10a of roll preform 53 is resting on the upper surface of the coining die 121. The movable die 120 has its nose portion engaging the airfoil section adjacent the top surface 10s. The inclined surface 124a of actuating member 124 has almost engaged the mating surface 122s. The engagement of the nose portion of coining die 120 with the airfoil section 10a has displaced downwardly the anvil 122b, as will be evident from a comparison of the positions of the parts in FIGS. 25 and 26. Thus, some bending of the airfoil section 10a has taken place with the parts in the positions shown in FIG. 26. In this connection, it will be understood that the base portion 10b of the preform 53 is securely held in the anvil recess. As the die-closing movement continues, the airfoil section 10a is further bent upwardly relative to the base 10b.

Figure 27:
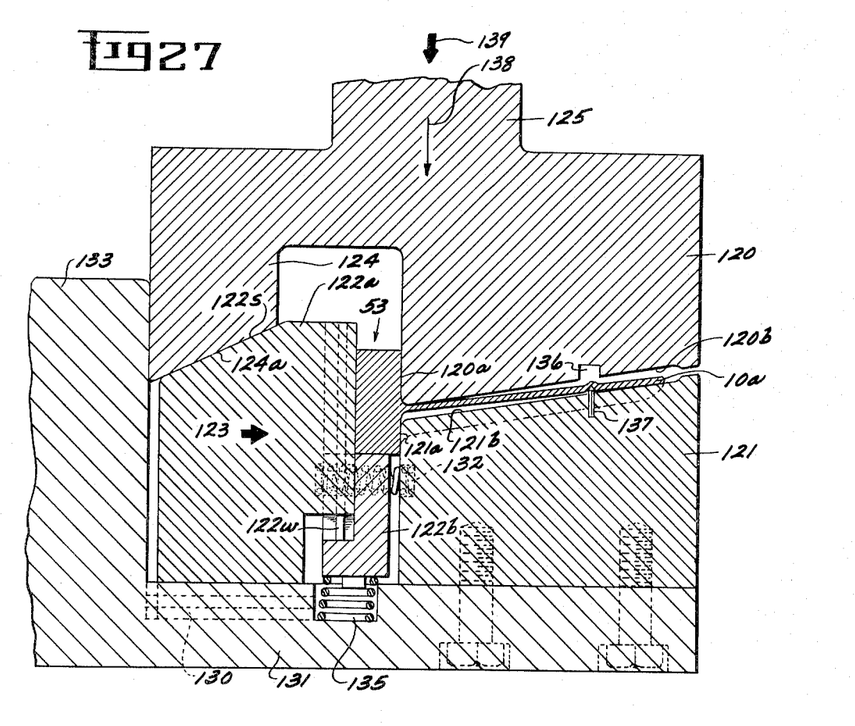
Figure 28:
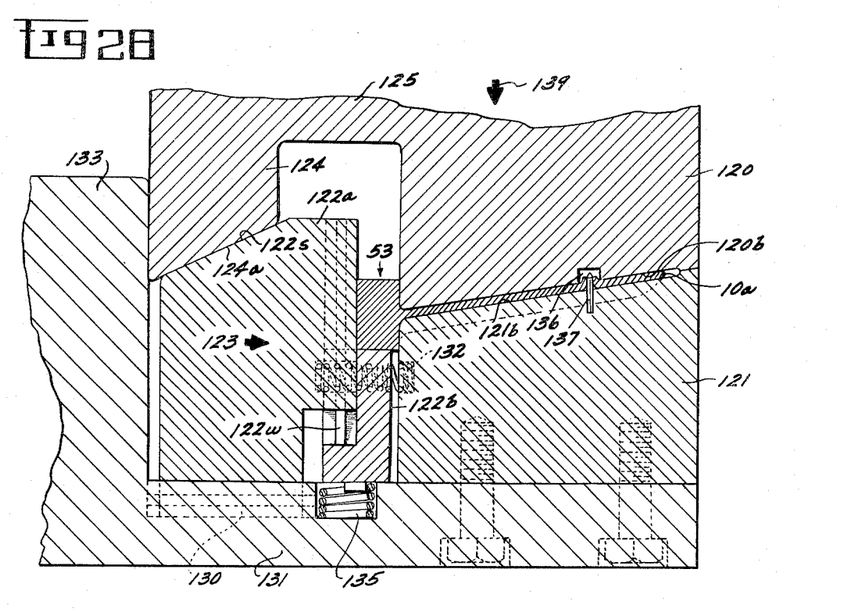

As the die 120 moves from the position of FIG. 26 through the position of FIG. 27 to the position of FIG. 28, the inclined actuating surface 124a of actuating member 124 engages the mating surface 122s of anvil member 122a to produce from force 139 a force 123 and rapidly to move the anvil members 122a and 122b to the right to seat the top surface 10s against the shoulders or opposing surfaces of the dies 120 and 121 in manner above described. It is to be noted, FIG. 27, that surface 10s is worked prior to complete coining of airfoil 10a. In the final position of the coining dies, FIG. 28, the anvil 122b seats against the frame 131 to limit the downward movement thereof.

Upon completion of the reshaping of the top surface 10s including the fillets 10f and the coining of the airfoil section 10a, the coining dies 120 and 121 are separated and the coined blade, as illustrated in FIG. 29, removed therefrom. The blade is then trimmed to predetermined lengths and widths, i.e., which are desired for the particular assembly of blades in a particular assemblage or stage thereof. The length and width trimming lines, FIG. 29, illustrate, with some exaggeration, the waste metal. The concurrent trimming to width is to meet the requirements of the particular aerodynamic application in providing the thicknesses at the leading and trailing edges needed in the final airfoil section. After the final trimming operation, FIG. 30, it is only necessary to remove trimming burrs and slightly to round the leading and trailing edges of the airfoil section to bring them into conformity with the aerodynamic requirements for the application to which the blade is to be applied. The final blade will represent a smoothly curved surface from front to back and including the forward and trailing edges.

Though not essential to the invention, it will be noted that the coining dies 120 and 121 have been respectively provided with a depression 136 and a pointed projection 137 to punch a hole 138 or to place a dimple in, or to pierce, the waste airfoil portion of the coined blade. By providing such a hole or dimple through that waste portion, there can be accurately established the distance from the base portion to the hole or dimple. Accordingly, with this reference point formed into the coined blade, the trimming line may be established with needed precision for producing matching blades of identical width and length and in the correct orientation relative to the top surface of the base in reference to the aforesaid stacking points.

With the above understanding of the operations by means of which the present invention may be practiced, those skilled in the art will understand how to adapt existing machines and/or to build other machines to carry out the method aspects of the present invention.

After the final trimming operations, the completed blade of FIG. 30 will then have the base portion 10b machined to size for assembly, such for example, as to form the driving and driven parts of gas turbines and for air compressor applications. For applications of this kind, blade manufacturing costs have been greatly reduced as a result of the present invention, and the blades resulting from the methods and apparatus described above are suitable for turbo-jet engine applications.

What is claimed is:

1. Apparatus for producing a blade from a blade blank which in a transition region joining a base portion and an airfoil section thereof has a cross-sectional area which gradually increases from the cross-sectional area of said airfoil section to that of said base portion, comprising a pair of dies, said dies including arcuate surfaces for roll-forming said airfoil section, supporting means for said dies for movement of at least one of said dies bodily toward the other of said dies from an initial position in which said blade blank is disposed between them to a final metal-forming position with progressive decrease in the separation distance between said dies, means for applying an actuating force to said supporting means for moving at least one of said dies toward the other for developing metal-pinching shaping forces on said transition region and for concurrently applying a compressive force to the base portion of the blade blank urging said blade blank toward and against said dies for shaping said transition region by the combined action of said compressive and pinching forces applied to said transition region, and means for actuating said dies for said roll-forming of said section effective after reversal of said compressive force applied to said base to place said airfoil section under tension whereby said roll-forming is accomplished with said airfoil section under tension.

2. The apparatus of claim 1 in which at least one of said dies is bodily moved through an arcuate path established by an axis of rotation spaced toward the other of said dies from a center line between said dies which generally coincides with the center line of said airfoil section when disposed between said dies.

3. The apparatus of claim 2 in which said dies are each rotatable about an axis, linkage means connected to said dies for rotating them, said linkage means including an equalizing link for maintaining said dies in predetermined angular positions as one die is bodily moved toward the other die to bring into registration with opposite faces of said transition reigon curved nose portions of said dies, said dies having arcuate surfaces for roll-forming said airfoil section, and actuating means pivotally connected to said equalizing link for rotating said dies to roll-form said airfoil section.

4. The apparatus of claim 3 in which said linkage means includes adjustable stops for adjusting the positions of said dies and of said equalizing link.

5. An apparatus for producing a blade from a blade blank which in a transition region joining a base portion and an airfoil section thereof has a cross-sectional area which gradually increases from the cross-sectional area of said airfoil section to that of said base portion, comprising a pair of dies, supporting means for said dies for movement of a first of them bodily toward and away form the second of said dies, said supporting means including bearings for rotatably supporting said dies for rotary movement, shuttle means movable along a path toward and away from said dies for supporting a blade blank for positioning the airfoil section thereof between said dies, carriage means supporting said shuttle means for its movement toward and away from said dies, a support for said carriage means for moving said carriage toward and away from said dies, biasing means for maintaining said carriage in predetermined spaced relation from said dies, said shuttle means in its forward position on said carriage toward said dies having a position short of that required to position said blade blank in roll-forming position between said dies, said dies having shoulders engageable by the top surface of said blade blank when said dies are substantially in closed position, means operative as said bodily movable die approaches said second die for positively actuating said carriage to move said top surface against said shoulders, said dies as they move to their final positions at least in part reshaping said top surface, and means for thereafter respectively rotating said dies for roll-forming said airfoil section.

6. The apparatus of claim 5 in which the supporting means includes first guiding surfaces, the shuttle means includes second and third guiding surfaces and the dies include fourth guiding surfaces, said first and second guiding surfaces cooperating to locate accurately the blade blank in a direction generally parallel to the axes through the bearings supporting said dies and said third and fourth guiding surfaces cooperating to locate accurately the blade blanks in a direction perpendicular to the axes of the bearings supporting said dies.

7. The apparatus of claim 5 in which said carriage has ways and in which said shuttle means is supported within said ways by bearing means for rotation of said shuttle means, resilient means for holding said shuttle means in a tilted position as the blade blank is moved between said dies, and actuating means operable by relative movement of said shuttle means relative to said carriage for rotating said shuttle means from said tilted position to a wide-angle position for insertion and removal of the blade blank from said shuttle means.

8. Apparatus for roll-forming a blade preform comprising a support, a first die rotatably mounted on said support, a second die, a supporting arm pivoted to said support at one end thereof and rotatably supporting said second die at the opposite end portion thereof, means for rotating said supporting arm bodily to move said second die toward said first die, linkage means including a pair of links connected at corresponding ends to said dies, a compensating link having its respective ends pivotally connected to said links, an actuator pivotally connected to said compensating link intermeidate said pivotal connections to said links, said compensating link being rotatable during rotation of said arm to predetermine the positions of said dies with respect to said blank preform, and means for energizing said actuator to rotate said dies to roll-form said blade preform.

9. In a machine for roll-forming a blade from a blade blank having an airfoil, at least one base and a fillet area between the airfoil and a base top surface, a frame, a pair of cooperating roll-forming dies, at least one of the dies being movable toward the other die, and rotatable means operatively connecting the dies with the frame and including an arm pivotally connecting the movable die with the frame at a pivot point nearer the other die than to the movable die whereby the movable die approaches the fillet area along a path avoiding the base top surface.

10. In a machine for roll-forming a blade from a blade blank having an airfoil, at least one base and a fillet area betwen the airfoil and a base top surface, the fillet area having a cross-section less than that of the airfoil, a frame, a pair of cooperating rolls, at least one of the rolls being movable toward the other roll, a pair of roll-forming dies carried by the rolls, and rotatable means operatively connecting the rolls with said frame and including an arm pivotally connecting the movable roll with said frame at a pivot point nearer the other roll than to the movable roll whereby the die on the movable roll approaches the fillet area along a path avoiding the base top surface.

11. For use in roll-forming a blade, a machine comprising a frame, a pair of cooperating roll-forming dies, at least one of the dies being movable toward the other die, rotatable means operatively connecting the dies with the frame and including an arm pivotally connecting the movable die with the frame at a pivot point nearer the other die than to the movable die, first actuating means operatively connected with each of the dies to rotate the dies, a first force producing means operatively connected with the movable die and adapted to impart reciprocating motion to the movable die and to force the dies into roll-forming relationship, a shuttle operatively connected with the frame and adapted to hold the blade with an airfoil generally toward the dies, second actuating means connected with the shuttle to impart reciprocating movement thereto, and a second force producing means to force the blade toward the dies, the first and second force producing means cooperating whereby the first force applied to the blade through the dies and the second force applied to the blade through the shuttle are applied before the first actuating means rotates the dies.

12. For use in roll-forming a blade from a blade blank having an airfoil, at least one base and a fillet area between a base top surface and the airfoil, the fillet area having a cross-section less than that of the airfoil, a frame, a pair of cooperating rolls, at least one of the rolls being movable toward the other roll, a pair of roll-forming dies carried by the rolls and having a portion cooperating in shape with the shape of the fillet area, rotatable means operatively connecting the rolls with the frame and including an arm pivotally connecting the movable roll with the frame at a pivot point nearer the other roll than to the movable roll whereby the die on the movable roll approaches the fillet area along a path avoiding the base top surface, first actuating means operatively connected with each of the rolls to rotate the rolls, a first force producing means operatively connected with the movable roll and adapted to impart reciprocating motion to the movable roll and to force the roll-forming dies into the roll-forming relationship, a carriage operatively connected with the frame, a shuttle operatively connected with the carriage and adapted to hold the blade with the airfoil generally toward the rolls, second actuating means connected with the shuttle to impart reciprocating movement thereto, and a second force producing means to force the blade toward the dies, the first and second force producing means cooperating whereby the first force applied to the blade through the rolls and the second force applied to the blade through the shuttle are applied before the first actuating means rotates the rolls.

13. For use in roll-forming a blade from a blade blank having an airfoil, at least one base and a reshaped fillet area between the airfoil and a base top surface, a frame, an arm, a pair of cooperating rolls, a pair of roll-forming dies carried by the rolls and having a tip portion smaller in radius than the radius of the reshaped fillet area, one of the rolls being movable toward the other roll and being rotatably connected with the arm which is pivotally connected with the frame at a pivot point nearer the other roll than to the movable roll whereby the die on the movable roll approaches the reshaped fillet area along a path avoiding the base top surface, the other roll being rotatively connected with the frame, a first link operatively attached to the movable roll, a second link operatively attached to the other roll, an equalizing link rotatively connected to the first and second links to allow the rolls to rotate at different rates of speed, an actuator connected in driving relationship with the equalizing link to impart reciprocating movement to the equalizing link and the first and second links to rotate the rolls, a first force producing means operatively connected with the movable roll and adapted to impart reciprocating movement to the movable roll and to force the roll-forming dies into roll-forming relationship, a carriage slidably connected with the frame, a shuttle carried by the carriage and adapted to hold the blade blank with the airfoil generally toward the rolls, actuating means connected with the shuttle to impart reciprocating movement thereto, an adjustable lever means operatively connecting the first force producing means with the shuttle to force the blade blank toward the dies with a second force, the first force producing means cooperating with said lever means whereby the first force applied to the blade blank through the rolls and the second force applied to the blade blank through the shuttle are applied before the actuator rotates the rolls.

14. The machine of claim 13 in which the actuating means connected with the shuttle to impart reciprocating movement thereto includes pressure relief means whereby the second force applied to the blade blank through the shuttle is controlled and limited.

References Cited by the Examiner
UNITED STATES PATENTS

| | | | |
|---|---|---|---|
| 53,258 | 3/1866 | Batcheller | 80—25 |
| 1,429,061 | 9/1922 | Coe | 80—29 |
| 1,840,059 | 1/1932 | Smith | 80—24 |

CHARLES W. LANHAM, *Primary Examiner.*